C. F. BATT.
TIRE CARRIER.
APPLICATION FILED APR. 1, 1909.
962,730.
Patented June 28, 1910.
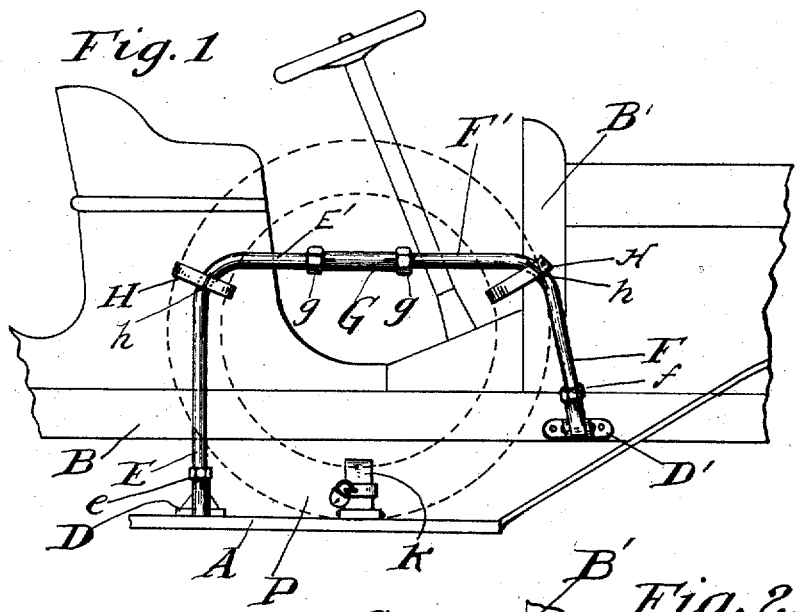
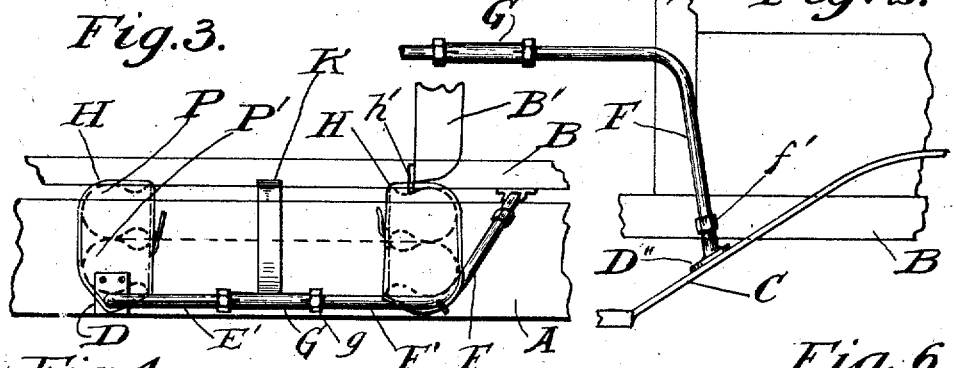
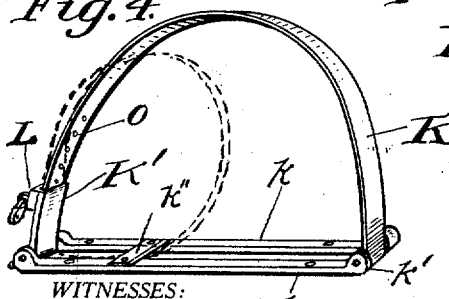
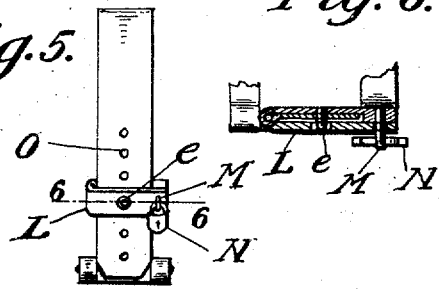
WITNESSES:
F. F. Chudoba.
H. Nuchmore
INVENTOR.
Charles F. Batt
BY Hermann P. Curtz
his ATTORNEY.

UNITED STATES PATENT OFFICE.

CHARLES F. BATT, OF NEW YORK, N. Y.

TIRE-CARRIER.

962,730.

Specification of Letters Patent. Patented June 28, 1910.

Application filed April 1, 1909. Serial No. 487,154.

*To all whom it may concern:*

Be it known that I, CHARLES F. BATT, a citizen of the United States, residing in the borough of Brooklyn, city and State of New York, have invented certain new and useful Improvements in Tire-Carriers, of which the following is a specification.

My invention relates to devices for conveniently and otherwise advantageously supporting spare tires as for automobiles, and is particularly applicable in the case of carrying extra tires on automobiles.

While susceptible of various modifications, I have shown a particular form of my invention in the accompanying drawings forming a part hereof and which is hereinafter specifically described.

In the drawings Figure 1 is a side elevation showing part of an automobile with tire holder attached; Fig. 2 is a fragmentary side view of an automobile showing frame, fender and modification in attachment of tire holder; Fig. 3 is a plan view showing tire holder and adjacent parts of an automobile; Fig. 4 is a view of the portion of tire holder adapted to lock the spare tires; Fig. 5 is the locking band or clamp; Fig. 6 is a section through 6—6 of Fig. 5.

In the particular form herewith illustrated, A is a running-board of an automobile, B is the frame, C is a mudguard or running-board extension. A frame comprises the standard or vertical member E, supported by a base D by means of a swiveling lock joint $e$. This standard is bent to a horizontal section E', and at or near the turn or bend is a small staple or like member $h$, which holds strap H in place. The horizontal section E' of the frame, which in this case consists of a tube, is surrounded by a sleeve G, which may be clamped to E' by means of a split end on G locked by means of a nut, thus constituting a slip joint. The other end of the sleeve G being slit and supplied with a nut constitutes a slip joint to lock it to the horizontal frame member F', which is bent downwardly constituting the inclined member F, while at or near the bend there is attached a staple or like device $h$ adapted to guide and support strap H. The end of the inclined frame member F is secured by a locking slip joint $f$ to a bracket D', which is attached to the vehicle frame B. This bracket, as shown in Fig. 1, is pivoted so that the inclined member F may be swung so as to position the horizontal member F'' near to the vehicle body or farther away depending upon whether one or more spare tires are to be carried between it and the vehicle body. In Fig. 2, the slip joint $f'$ at the lower end of F locks that member to a bracket D'' which is attached to an inclined vehicle member, such as the running-board or mudguard C.

Located on the running-board substantially at the point where the spare tires will contact when in position, there is a clamp K which consists of a base $k$ $k$ which is bolted or screwed to the running-board. At the end of this base is a pin securing means for the clamp band K. As shown in detail in Figs. 4, 5 and 6, the other parts of this clamp include a clasp K' pivoted to the other end of the base and forming between it and strap L a socket for the end of the band K to pass through, while in this clasp L is located a pin $e$ adapted to register in one of the holes O in the end of the band K. This clasp L when swung in position locks the end of the band K by means of the pin $e$ registering with one of the holes O and also entering the main portion of the clamp K', while pad-lock N engaging the staple M secures the clasp L in the locking position. The number of holes O in the band K permits the accommodation of different sizes of tires as desired. For a different number of tires, for instance, to accommodate one or two spare tires I shift the place of attachment of band K. As shown in Fig. 4, the ends $k'$ of the base members $k$ are connected by a bar, while attached to the end of band K there is a pin which engages the inner side of the enlargements $k'$. This permits the band K to be slid backward and pulled from under the bar connecting the two ends $k'$, and when so removed the end of the band K supplied with holes is passed under the clasp member K' and also under the transverse member $k''$, and when pulled through, the pin at its other end engages the enlargements at the locking end of the base $k$, leaving the band K in the dotted position and so arranged it is suitable to snugly clamp a single spare tire.

The standard or vertical member E is located at a suitable distance from the body of the vehicle to accommodate one or more tires as desired, while the horizontal frame section E' F' extends substantially parallel with the body of the vehicle, depending upon the number of tires placed between the frame and the vehicle body. This horizontal section of the frame may be inclined toward the body by loosening the slip joint e and turning in the horizontal frame member as desired, and then locking the standard in such swiveled position by means of the slip joint e, which then secures it against any further movement with respect to the base D. To permit this swiveling one of the joints g is loosened and on deflecting the horizontal member the vertical member F turns in its bracket pivot, as shown in the construction in Fig. 1, while at the same time the joint f is loosened to permit the slight turning of F in its socket. When the position of the holder has been so changed, the split tube joints g, f are again tightened, locking the carrier in its position to accommodate the number of spare tires desired.

The straps at or near the bends in the frame, located substantially where the vertical and horizontal and inclined members meet, are led around the spare tires and secured, thereby holding the spare tires tightly strapped to the frame. These straps each secure the tires at almost diametrically opposite points, while the locking clamp at the base secures the tires at another point intermediate, thereby clamping the spare tires at three points in their circumference, which, generally speaking, are almost equi-distant and thus effect a very secure holding of the spare tire or tires in the predetermined plane. It is desirable to hold these tires in a predetermined plane, not projecting too far from the vehicle where they would catch on passing objects, and at the same time holding them away from any levers or operating devices on the body of the automobile, so as to not interfere with the movement of the operator in controlling the machine. The location of the standard E will hold the tires in a fixed position free from the body, while the split tube joints and front pivoted bracket permit the forward part of the frame to be deflected as above stated, so that it can be swung close in toward the body presenting no obstruction liable to engage passing objects. In some cases the spare tires may be clamped close to the side of the dashboard, and for this I may provide a staple or slotted plate h' through which to reeve the forward strap H. In this latter case the forward strap H draws the forward end of the horizontal member of the frame toward the dash, clamping the tires and frame members tightly to the body of the vehicle by means of the attachment to the dashboard B'.

By my construction it will be seen that a secure holder is provided, and when no spare tires are carried the forward end of the holder may be inclined to the vehicle and thereby put practically out of the way, presenting no projection on the side of the vehicle liable to catch on passing objects. At the same time, the forward member of the frame F, which extends in a direction inclined to the plane of the spare tires when in position, practically crosses in front of the spare tires which may be put in position abutting against it, thereby definitely locating the position of the spare tires to be carried. Furthermore, this front member of the frame acts as a guard to deflect any object which might brush by, and so prevents impact with the spare tire which might injure it.

By means of the adjustable joints and the telescopic parts I can manufacture my holder of one size, and when attached to any particular car or other object, such adjusting means permit the adoption of any difference in arrangement and proportions of the parts of the car and permit accommodating any different size or number of tires as desired.

While I have referred to spare tires, it will be understood that spare wheels as well as other like objects, may be carried, while the holder can be readily adapted in part or whole for the accommodation of other objects as may be desired.

While I have shown and described a particular form of my holder for automobiles, my invention is susceptible of varying construction and arrangement, and I do not mean to confine it to the particular form shown or described, but

What I claim and desire to secure by Letters Patent is:

1. A spare tire holder comprising a frame consisting of a vertical section, a horizontal section adapted for adjustment to a vehicle on the outer side of the spare tire, a section of said frame constituting a continuation of the horizontal section and inclined in front of said spare tire toward the vehicle frame, securing means on said frame, brackets to support said vertical section and said inclined section.

2. A spare tire holder comprising a frame consisting of a standard section, a horizontal section and inclined section and extension joint in said horizontal section, a swivel joint and locking means in said standard section.

3. A spare tire holder including a bracket secured to the running-board of an automobile, a band secured to one end of said bracket and means for locking the other end of said band to a member secured at the other end of said bracket to lock a spare tire against removal at one point, in combination with a frame member extending from said running-board and passing laterally of said tire having means for securing a spare tire at two other points to hold said tire in a vertical plane substantially as and for the purpose described.

4. In a spare tire holder, a bracket adapted to secure and lock a tire comprising a flat base, a flexible metal band pivoted to one end of said base and having a plurality of holes at the other end, a spring clasp attached to the other end of said base and including a pin adapted to engage a hole in said metal band, means for locking said clasp and holding said pin in engagement with said band, other members attached to said vehicle adapted to hold the spare tire in a predetermined plane.

5. A spare tire holder comprising a frame consisting of a standard section, a horizontal section, an inclined section, adjustable joints in said sections whereby the holder may be arranged to accommodate different sizes of tires and be attached to different constructions of cars.

6. In combination with a spare tire holder a clamping device including a base, a detachable metal band and a pivot on said band and recesses on said base whereby said band may be shifted to a plurality of positions on said base.

This specification signed and witnessed this 25th day of March, A. D., 1909.

CHARLES F. BATT.

Witnesses:
HERMANN F. CUNTZ,
JAMES M. CARPLES.